United States Patent
Rous et al.

(10) Patent No.: US 10,246,054 B2
(45) Date of Patent: Apr. 2, 2019

(54) METHOD AND DEVICE FOR ENABLING ACCESS TO A PASSENGER COMPARTMENT OF A MOTOR VEHICLE, IN PARTICULAR FOR CONVEYING A CONSIGNMENT OF GOODS

(71) Applicant: Robert Bosch GmbH, Stuttgart (DE)

(72) Inventors: Martin Rous, Mundelsheim (DE); Volker Hofsaess, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/575,825

(22) PCT Filed: May 11, 2016

(86) PCT No.: PCT/EP2016/060550
§ 371 (c)(1),
(2) Date: Nov. 21, 2017

(87) PCT Pub. No.: WO2016/188751
PCT Pub. Date: Dec. 1, 2016

(65) Prior Publication Data
US 2018/0148016 A1 May 31, 2018

(30) Foreign Application Priority Data
May 22, 2015 (DE) .......................... 10 2015 209 482

(51) Int. Cl.
*H04L 29/06* (2006.01)
*G08B 13/22* (2006.01)
(Continued)

(52) U.S. Cl.
CPC ............ *B60R 25/241* (2013.01); *B60R 25/01* (2013.01); *B64C 39/024* (2013.01);
(Continued)

(58) Field of Classification Search
CPC .. G06Q 10/083; G06Q 10/08; G06Q 10/0832; G06Q 10/0833; G06Q 10/0836;
(Continued)

(56) References Cited

U.S. PATENT DOCUMENTS

| | | | |
|---|---|---|---|
| 2013/0033381 A1* | 2/2013 | Breed | B60T 1/005 340/568.1 |
| 2014/0022051 A1 | 1/2014 | Levien et al. | |

(Continued)

FOREIGN PATENT DOCUMENTS

| | | |
|---|---|---|
| AU | 2015100226 A4 | 4/2015 |
| DE | 199 04 737 A1 | 8/2000 |

(Continued)

OTHER PUBLICATIONS

International Search Report corresponding to PCT Application No. PCT/EP2016/060550, dated Aug. 10, 2016 (German and English language document) (8 pages).

(Continued)

*Primary Examiner* — Dionne Pendleton
(74) *Attorney, Agent, or Firm* — Maginot, Moore & Beck LLP

(57) ABSTRACT

The present disclosure is based on a device and on a method for enabling access to a passenger compartment of a motor vehicle, wherein the motor vehicle has at least one sensor which senses the surroundings and and/or the passenger compartment of the motor vehicle. The core of the present disclosure is that the enabling of access which occurs in response to an enabling request originating from outside the motor vehicle takes place at least as a function of the sensing by the sensor. The disclosure advantageously provides secure access to the passenger compartment of a motor vehicle.

7 Claims, 2 Drawing Sheets

(51) Int. Cl.
*B60R 25/24* (2013.01)
*B64C 39/02* (2006.01)
*G06Q 10/08* (2012.01)
*B60R 25/01* (2013.01)
*G07C 9/00* (2006.01)

(52) U.S. Cl.
CPC .... *G06Q 10/0832* (2013.01); *B64C 2201/128* (2013.01); *G05D 2201/0207* (2013.01); *G05D 2201/0216* (2013.01); *G07C 2009/0092* (2013.01)

(58) Field of Classification Search
CPC ........ G06Q 50/28; G06Q 50/30; G06Q 50/32; A47G 2029/1226; A47G 2029/149; A47G 29/1225; A47G 29/124; A47G 29/141; B60R 25/083; B60R 25/24; B60R 35/241; B60R 25/01; B60R 25/04; B60R 25/045; G01S 19/01; G01S 5/0236; G07C 2009/00547; G07C 2009/00793; G07C 2009/00833; G07C 2009/0092; G07C 9/00103; G07C 9/00309; G07C 9/00571; G07C 9/00896; G07F 17/12; H04W 12/08; H04W 4/025; H04W 68/005; H04W 8/24; Y10T 477/647; B64C 2201/1289; B64C 39/024; G05D 2201/0207; G05D 2201/0216
See application file for complete search history.

(56) References Cited

U.S. PATENT DOCUMENTS

| | | | |
|---|---|---|---|
| 2015/0116107 | A1 | 4/2015 | Fadell et al. |
| 2015/0154559 | A1* | 6/2015 | Barbush ........... G06Q 10/08355 705/338 |
| 2016/0176381 | A1* | 6/2016 | Krawciw ................ B60R 25/04 340/5.72 |
| 2016/0285863 | A1* | 9/2016 | Canavor ............. H04L 63/0823 |
| 2017/0154483 | A1* | 6/2017 | Cordiner ............ G07C 9/00571 |
| 2017/0287244 | A1* | 10/2017 | Jansen ............... G07C 9/00103 |

FOREIGN PATENT DOCUMENTS

| | | |
|---|---|---|
| DE | 199 53 622 A1 | 5/2001 |
| DE | 10 2008 063 366 A1 | 7/2010 |
| DE | 10 2011 018 901 A1 | 10/2011 |
| DE | 10 2011 089 496 A1 | 6/2013 |
| DE | 10 2013 220 240 A1 | 4/2015 |
| EP | 2 397 051 A1 | 12/2011 |
| JP | 2006-206225 A | 8/2006 |
| JP | 2008-30670 A | 2/2008 |

OTHER PUBLICATIONS

Volvo Car Group Global Media Newsroom, "Volvo Cars demonstrates the potential of connected cars with deliveries direct to people's cars", Feb. 20, 2014, ID:139114, 4 pages.
Megan Geuss, "Amazon, Audi, and DHL want to turn a car trunk into a delivery locker", Apr. 22, 2015, 2 pages, Ars Technica.

* cited by examiner

METHOD AND DEVICE FOR ENABLING ACCESS TO A PASSENGER COMPARTMENT OF A MOTOR VEHICLE, IN PARTICULAR FOR CONVEYING A CONSIGNMENT OF GOODS

This application is a 35 U.S.C. § 371 National Stage Application of PCT/EP2016/060550, filed on May 11, 2016, which claims the benefit of priority to Serial No. DE 10 2015 209 482.0, filed on May 22, 2015 in Germany, the disclosures of which are incorporated herein by reference in their entirety.

The present disclosure relates to a method and a device for authorization to a passenger compartment of a motor vehicle, in particular for conveying a consignment of goods.

DE 10 2011 089 496 A1 shows a system and a method for conveying consignments of goods in motor vehicles, in which the access to the motor vehicle is made possible via communication between the supplier, the driver, and a control unit of the vehicle.

SUMMARY

The present disclosure is directed to a device and a method for enabling access to a passenger compartment of a motor vehicle, wherein the motor vehicle includes at least one sensor detecting the surroundings and/or the passenger compartment of the motor vehicle.

The core of the present disclosure is that, in response to an authorization request coming from outside the motor vehicle, the authorization takes place at least as a function of the detection by the sensor. The present disclosure advantageously provides secure access to the passenger compartment of a motor vehicle.

According to the present disclosure, for enabling the access, the immediate surroundings and/or the passenger compartment of the motor vehicle are checked to determine whether a safe delivery is ensured.

In response to the authorization according to the present disclosure, the conveyance of a consignment of goods into the passenger compartment of the motor vehicle may be enabled.

In response to the authorization according to the present disclosure, at least one opening to the vehicle passenger compartment may be opened. For this purpose, for example, the roof and/or the trunk and/or the hatch door of the motor vehicle is opened.

The sensors according to the present disclosure include at least one radar sensor, lidar sensor, ultrasonic sensor, infrared sensor, and/or a video system. During the operation of the motor vehicle, such sensors may be used for driving assistance or driver assistance and/or for safety functions. Since the level of equipment of modern motor vehicles is relatively high, the present disclosure requires no particular additional expenditure for the sensor system.

This is particularly advantageous if the authorization takes place according to the present disclosure when the vehicle is stationary; i.e., the sensor system is not required for driving assistance or driver assistance and/or for safety functions.

In one advantageous embodiment of the present disclosure, it is provided that, at least as a function of the detection by the sensor, a risk level is ascertained which represents the risk of unauthorized access to a consignment of goods to be conveyed into the motor vehicle and/or to the passenger compartment of the motor vehicle. The authorization then takes places as a function of the risk level. In this case, the risk level may represent the presence of persons in the surroundings of the motor vehicle. The surroundings may be predetermined, for example, as being the area within a predetermined distance from the vehicle.

In an additional advantageous embodiment of the present disclosure, it is provided that, at least as a function of the detection by the sensor, a state variable is ascertained which represents the state of at least a portion of the passenger compartment of the motor vehicle. The authorization then takes place as a function of the state variable. In this embodiment, in particular a passenger compartment camera is intended as a sensor. The authorization then takes place as a function of whether a person is in the passenger compartment of the vehicle and/or objects are in the passenger compartment in a predefinable manner.

According to the present disclosure, a method is also provided for conveying consignments of goods via the aforementioned device according to the present disclosure, for enabling access to a passenger compartment of a motor vehicle. In addition, conveyance to an alternative location takes place in response to an unsuccessful authorization.

According to the present disclosure, a device for enabling access to a passenger compartment of a motor vehicle is also provided. In this case, the motor vehicle includes at least one sensor detecting the surroundings and/or the passenger compartment of the motor vehicle. The core of the present disclosure is that means are provided via which the authorization takes place at least as a function of the detection by the sensor. In response to enabling the access, a consignment of goods may then be conveyed into the passenger compartment of the motor vehicle.

Additional advantageous embodiments may be found in the disclosure.

BRIEF DESCRIPTION OF THE DRAWINGS

Exemplary embodiments of the present disclosure will be described below, based on drawings. The following are shown:

FIG. 1 shows an overview depiction of an embodiment of the present disclosure, while

DETAILED DESCRIPTION

Figure 1:
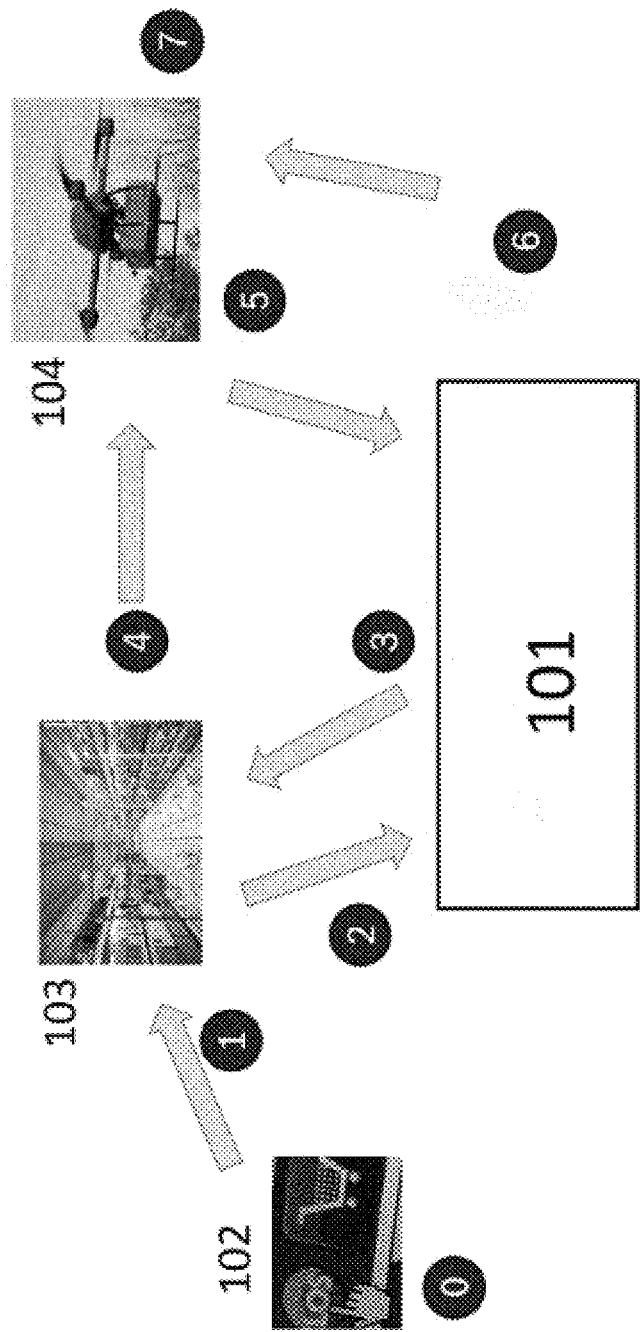

In FIG. 1, reference numeral 102 (step 0) indicates an ordering process 1 for goods which generally takes place via the Internet. The purchaser selects from various possible shipment or delivery types. The core of the depicted embodiment of the present disclosure is the delivery of the goods via an unmanned aircraft, also known as a drone or quadcopter, to or into a particular motor vehicle 101.

In step 2, the order is then processed by the supplier 103. For this purpose, for example, a time window for delivering the goods to or into the motor vehicle 101 is communicated or agreed.

In step 3, the motor vehicle 101 transmits its exact position data to the supplier 103 or to the directly to the aircraft 104, before and/or during the delivery of the goods. The position data may be ascertained via GPS (Global Positioning System).

In step 4, the supplier 103 then initiates the delivery of the goods by means of the aircraft 104 to the motor vehicle, using the transmitted position data, which, for example, may also be updated during the delivery.

When the aircraft 104 has reached the motor vehicle 101, in step 5, it requests authorization for unloading the goods into the motor vehicle 101.

Subsequently, in step 6, the motor vehicle checks, by means of the surroundings sensor system installed in the motor vehicle, whether and which time window the delivery of the goods may safely take place. For example, this may be within a corresponding time window if no person is within the radius of approximately 5 meters of the motor vehicle. In addition, by appropriately sensing the vehicle passenger compartment, it may also be checked that there are no passengers or other objects in the vehicle which prevent the delivery of the goods.

In step 7, an authorization is granted to the aircraft 104 by the motor vehicle 101, wherein the motor vehicle opens an opening of the motor vehicle, for example, a sunroof or a trunk lid. After delivering the goods into the motor vehicle, the motor vehicle recloses the opening. This may take place in a time-controlled manner (opening within a certain period) or in an event-controlled manner (receipt and/or delivery of the goods is detected).

Figure 2:
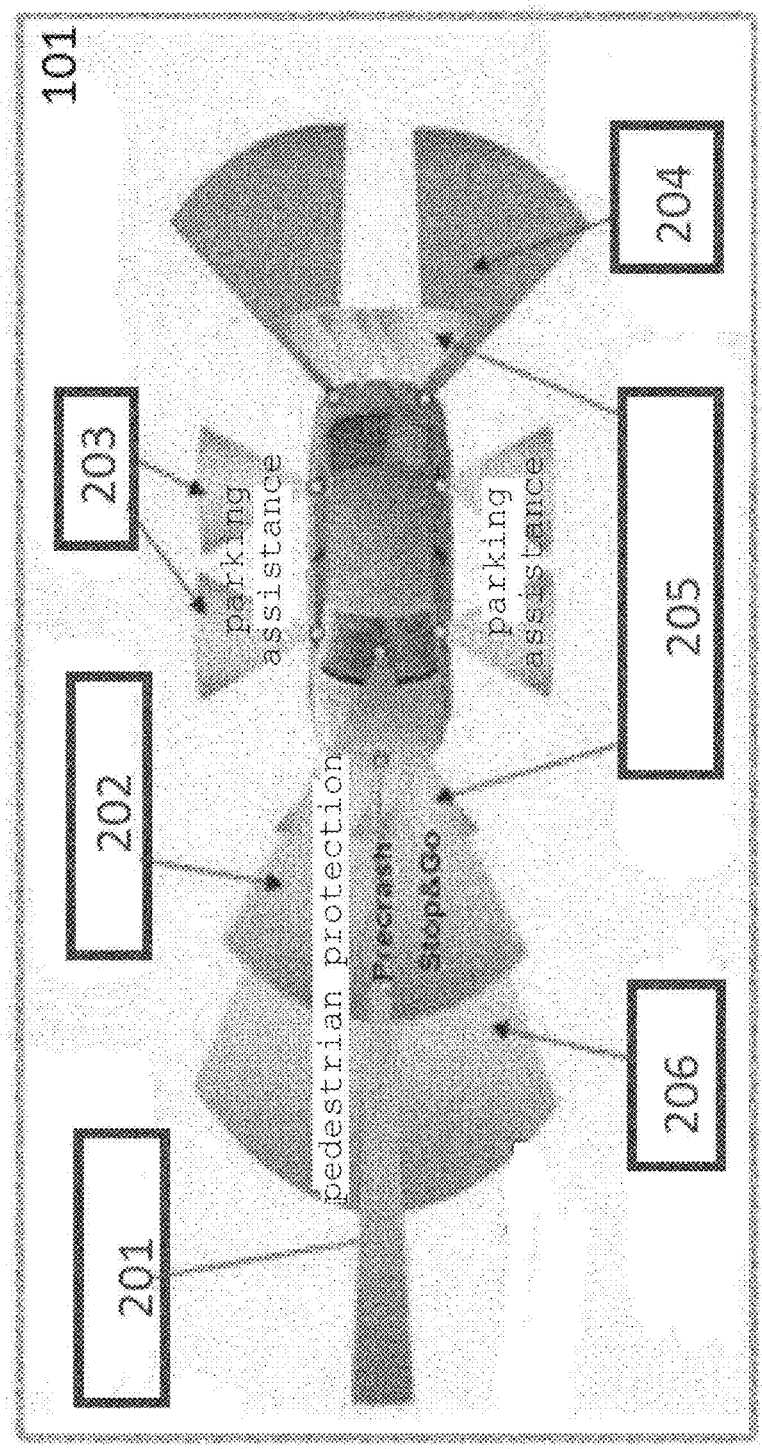
FIG. 2 depicts the sensor system of the motor vehicle in detail.

FIG. 2 shows, by way of example, a sensor arrangement of a motor vehicle as is already extensively employed today as standard equipment for implementing driver assistance functions. The shading shown in FIG. 2 schematically depicts the detection ranges of the individual sensors.

A so-called long-range radar (LRR, 77 GHz) is attached in the front vehicle area and is used during driving operation, for example, for adaptive/automatic cruise control (ACC). IR sensors 202 are provided for implementing the functionality of pedestrian protection, pre-crash, and/or stop-and-go. Side cameras 203 and/or laterally arranged ultrasonic sensors are used for parking assistance. Furthermore, ultrasonic sensors 204 are generally integrated into the rear and/or front vehicle area for parking assistance. Blind-spot monitoring may take place by means of a so-called mid-range radar 205 (UMRR, 24 GHz). Furthermore, a video camera 206 may be integrated into the front vehicle area for implementing a variety of driving assistance functions. Furthermore, it may be provided that the vehicle passenger compartment is monitored via an interior camera or other sensor systems detecting objects/persons.

The core of the present disclosure according to this exemplary embodiment is to achieve the requirement at the delivery location, for example, a vehicle 101, for example, by opening the sunroof, taking into consideration:

ordering and delivery conditions (step 0)
determining the delivery time (for example, the time window of the delivery, theft protection), (step 1)
the delivery location (vehicle identification), (steps 1 to 5)
the surroundings of the delivery location, for example, the vehicle (theft protection), (step 6)
the vehicle passenger compartment (passenger protection), (step 6)
identification of the supplier (step 5)
confirmation of the delivery by the supplier and by the vehicle
acknowledgment of receipt of the delivery, for example, by means of an electronic signature (for example, a digital signature) via the vehicle.

A short summary of steps 0 to 7 shown in the figure:

0. The purchaser places the order, for example, with an Internet dealer.
1. The purchaser opts for delivery by quadcopter, for example, to the purchaser's vehicle or an alternative.
2. A time window for the delivery to the vehicle is communicated by the supplier, for example, via GSM.
3. The vehicle reports its position data to the supplier, for example, via GSM.
4. The goods are, for example, flown by quadcopter to the unloading point, for example, the position of the vehicle.
5. The quadcopter requests authorization from the vehicle to unload the goods.
6. The vehicle ascertains the surroundings within, for example, 5 m, by means of sensor systems, for example, radar sensors, lidar sensors, ultrasonic sensors, infrared sensors, or video systems, and assesses the situation based on a risk model (how many persons are in the surroundings, the risk potential of the area, environs).
7. If the situation is deemed to be safe, for example, if there are no persons within a radius of 5 m, the vehicle grants the authorization and transmits it to the quadcopter and opens, for example, the sunroof or the trunk, and recloses it after the package has been discharged. The authorization may additionally be supported by the use of RFIDs, in order to ensure unambiguous delivery (identification and confirmation of the goods).

The successful delivery is communicated to the purchaser. In addition, it is possible to allow communication between multiple unloading points. If one unloading point is currently unavailable, the next one is automatically attempted.

Appendix:

The invention claimed is:

1. A motor vehicle comprising:
    at least one sensor configured to detecting a surroundings of the motor vehicle;
    a compartment; and
    an authorization device operatively connected to the at least one sensor and the compartment, the authorization device being configured to:
        receive an authorization request transmitted from an automated drone that is outside the motor vehicle;
        perform a successful authorization to the compartment in response to the request only in response to detecting that no humans are within a predetermined radius of the motor vehicle based on data corresponding to the surroundings of the motor vehicle received from the at least one sensor; and
        open the compartment to receive a consignment of goods from the automated drone only in response to the successful authorization.

2. A method for enabling access to a passenger compartment of a motor vehicle, the method comprising:
    detecting, with at least one sensor of the motor vehicle; and
    performing an authorization of the access, in response to an authorization request transmitted from an automated drone that is outside the motor vehicle, the authorization of access further comprising:
        performing a successful authorization to a compartment of the motor vehicle only in response to detecting that no humans are within a predetermined radius of the motor vehicle based on data corresponding to the surroundings of the motor vehicle received from the at least one sensor; and
    opening the compartment in the motor vehicle to receive a consignment of goods from the automated drone only in response to the successful authorization.

3. The method as claimed in claim 2, wherein the at least one sensor is at least one of a radar sensor, a lidar sensor, an ultrasound sensor, an infrared sensor, and a video system.

4. The method as claimed in claim 2, wherein the authorization is performed only when the motor vehicle is stationary.

5. The method as claimed in claim 2, further comprising:
performing at least one of (i) driving assistance and (ii) safety functions using the at least one sensor during a driving operation of the motor vehicle.

6. The method as claimed in claim 2, further comprising:
ascertaining, with a camera in a passenger compartment of the motor vehicle, a state variable representing occupancy of the passenger compartment of the motor vehicle by at least one of a person or an object, wherein the authorization occurs as a function of the state variable.

7. The method as claimed in claim 2, further comprising:
conveying, with the automated drone, the consignment of goods to an alternative location in response to an unsuccessful authorization.

\* \* \* \* \*

UNITED STATES PATENT AND TRADEMARK OFFICE
CERTIFICATE OF CORRECTION

PATENT NO.        : 10,246,054 B2
APPLICATION NO.   : 15/575825
DATED             : April 2, 2019
INVENTOR(S)       : Rous et al.

It is certified that error appears in the above-identified patent and that said Letters Patent is hereby corrected as shown below:

In the Claims

In Column 4, Lines 47-48, Lines 3-4 of Claim 2 should read:
detecting, with at least one sensor of the motor vehicle
    a surroundings of the motor vehicle; and Signed and Sealed this
Twenty-seventh Day of August, 2019

Andrei Iancu
*Director of the United States Patent and Trademark Office*